United States Patent Office 3,826,623
Patented July 30, 1974

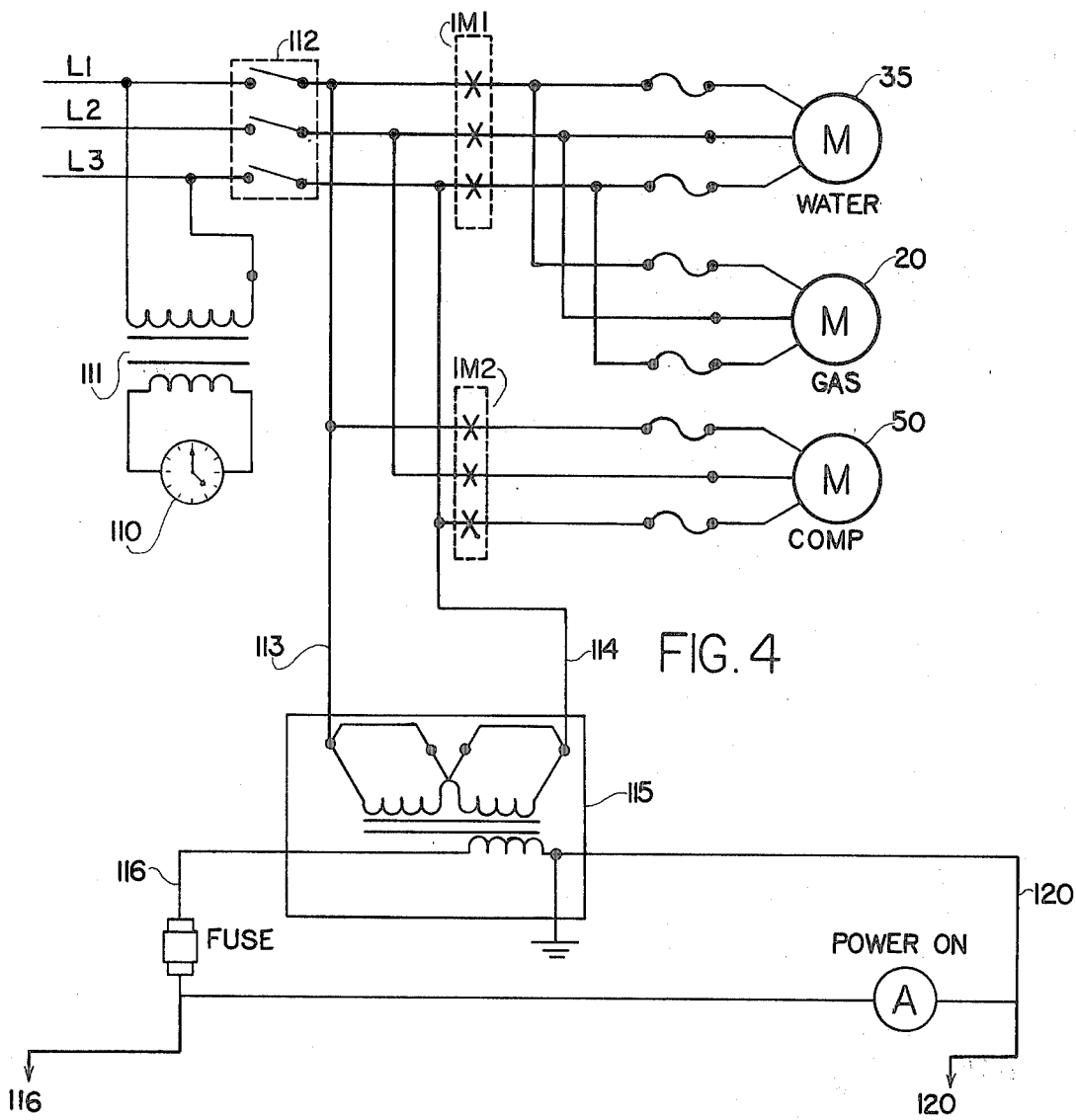

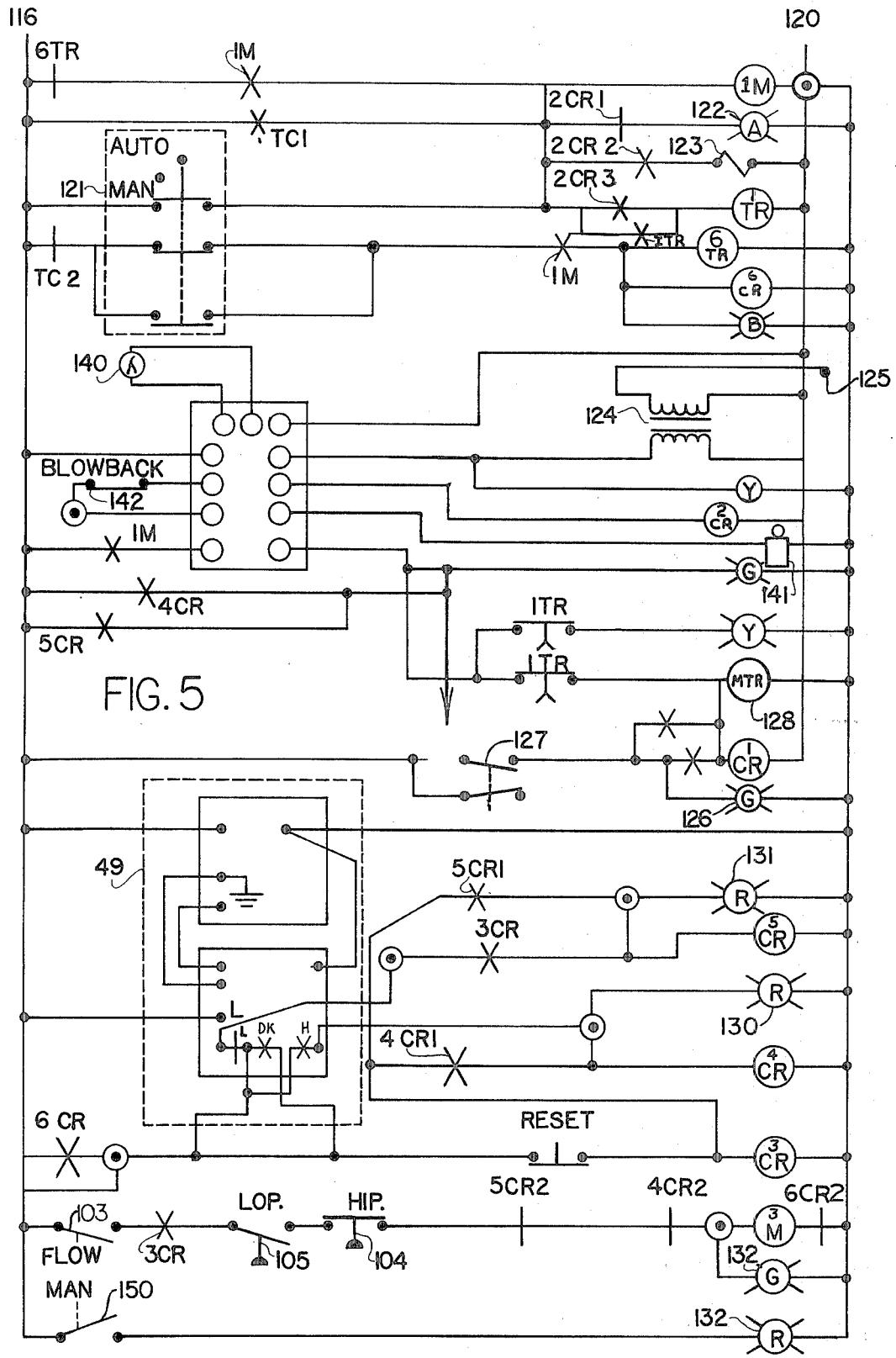

3,826,623
EXOTHERMIC GAS GENERATOR
Manuel M. Delgado, La Mirada, Calif. (% John E. Wagner, attorney at law, 1041 E. Green St., Suite 201, Pasadena, Calif. 91106)
Filed Feb. 7, 1972, Ser. No. 224,058
Int. Cl. B01j 7/00; C10b 1/04
U.S. Cl. 23—281                               14 Claims

ABSTRACT OF THE DISCLOSURE

A vertically oriented reaction chamber for the production of gaseous products from the combination of air and fuel. The reaction chamber is contained within an outer shell with a flow path of incoming fuel and air at the bottom to the reaction chamber and a restricted outlet at the top of the reaction chamber communicating with a domed space within the outer shell. A reentrant gas flow path is defined by the reaction chamber and the shell. Temperature and pressure responsive valves control either the discharge or collection of gaseous products.

BACKGROUND OF THE INVENTION

The use of inert gas in the processing and storage of food products has become known and is becoming of great importance in the food industry. Heretofore upwards to from 6 to 25 percent of certain food products are discarded due to spoilage from oxygen supported bacterial and enzyme action. The Patent 2,490,951 to M. E. Dunkley taught the basic principal of food preservation employing oxygen free gases which contain carbon monoxide and acetylene as significant constituents. The U.S. Pat. 3,177,150 to J. W. Cameron also discloses an exothermic gas generator and process for producing gas mixtures for food processing which are oxygen and acetylene free and have enhanced food preservation properties.

BRIEF STATEMENT OF THE INVENTION

I have invented an improved gas generator for producing the gaseous mixture of the Cameron patent and for controlling the composition of the combustion products of the generator and its operation more completely to insure precise gas composition and safe operation of the generator.

Specifically, I have produced a vertically oriented combustion retort with substantially closed refractory burner chamber terminating in a cooled expansion chamber which in turn communicates with a reentrant gas flow path between the refractory chamber and a cool wall similar to the Cameron return flow path. I have found that separating the combustion chamber from the cooling stage by an apertured refractory end wall of the combustion chamber provides more precise composition combustion products with a broader range of operating temperatures then heretofore possible. Additionally I have produced an automatic system for control and sequencing of the gas generator whereby operation on a virtually unattended basis is possible while precise gas composition and quantity is maintained.

BRIEF DESCRIPTION OF THE DRAWINGS

This invention may be more clearly understood from the following detailed description and by reference to the drawing in which:

FIGS. 4 and 5 form an electrical schematic of the system of this invention; and

FIG. 6 is a layout diagram of FIGS. 4 and 5.

DETAILED DESCRIPTION OF THIS INVENTION

Figure 1:
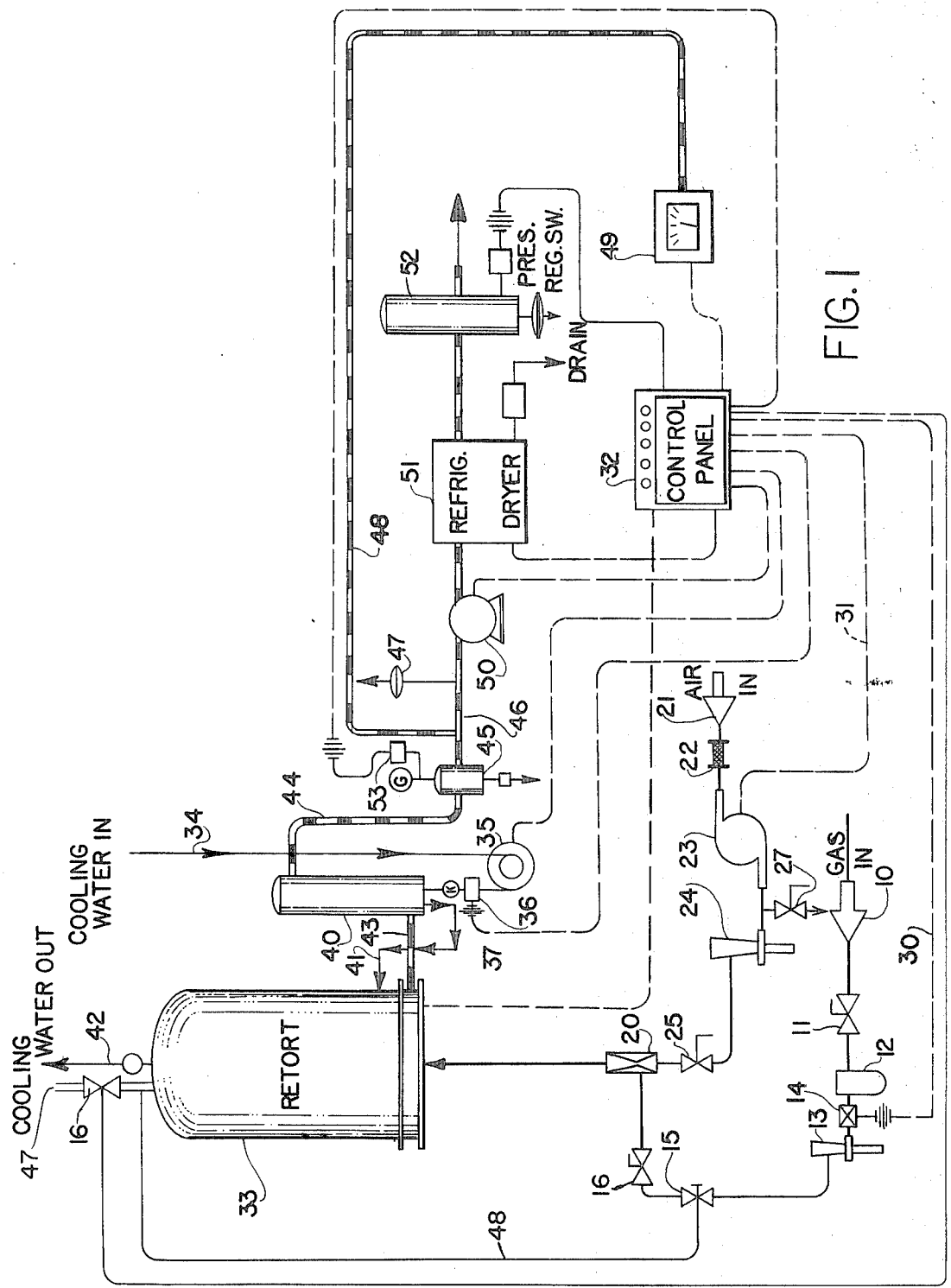
FIG. 1 is a block diagram of the system of this invention.

This invention is directed toward the production of a gaseous mixture containing the following constituents:

|  | Mole percent |
|---|---|
| Hydrogen | 2.7–2.9 |
| Carbon monoxide | 3.0–3.9 |
| Carbon dioxide | 9.8–10 |
| Nitrogen and argon | 83.9–85 |
| Oxygen | 0.0–0.15 |

This gas mixture is produced from the controlled combustion in air of natural gas, propane or butane. The production of the gas mixture is accomplished using the system of FIG. 1 which comprises basically a source of combustion gas 10 passing through a main valve cock 11, a filter 12 and gas flow scope 13 to a sampling valve 14 and pressure regulator valve 15 and a manual regulator valve 16 to an air-gas mixer 20. Ambient air is drawn in through inlet 21, filter 22 and pump 23 to air flow scope 24 to a manual valve 25 and thence to the mixer 20. Gas flow is sampled at valve 14 and air is sampled from pump 23 and introduced over respective monitoring lines 30 and 31 to the system control panel assembly 32. The air supply system also includes a vent air regulator valve 27 for maintaining a predetermined air pressure input to the system.

Figure 2:
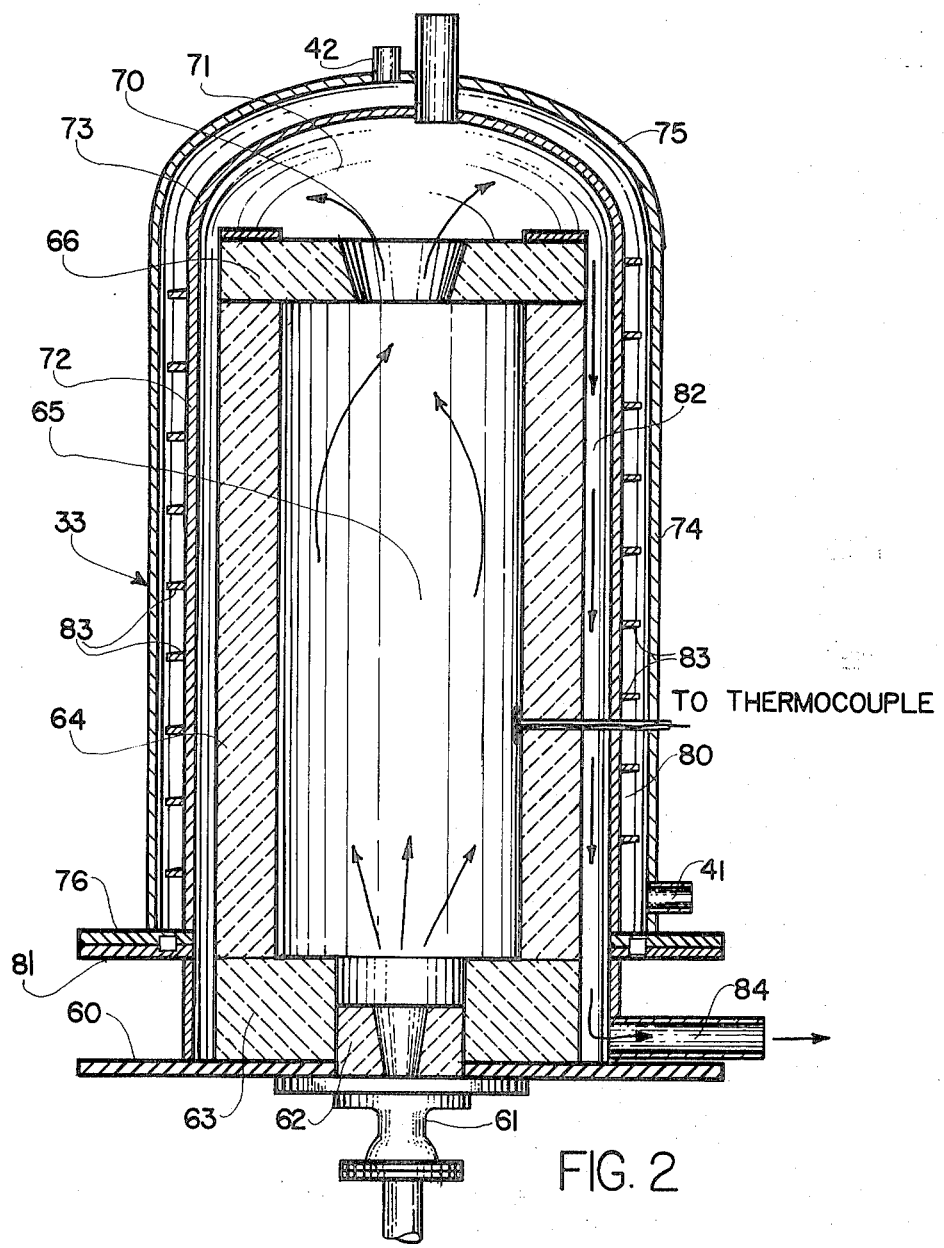
FIG. 2 is a vertical section through the improved retort of this invention.

The air-gas mixture which is regulated to a mixture of 9 to 1 by volume is introduced into a vertically oriented retort 33 best described in FIG. 2. The retort is double walled and includes a water jacket fed by a source of cooling water 34 via a centrifugal pump 35, a flow switch 36, a precooler 40 and water input line 41. Cooling water exits from the retort 33 via line 42 which may be connected to a discharge line or to a cooling tower for recycled use depending upon the particular system requirements. The gas mixture is ignited by a spark igniter within the retort powered from the control panel 32 via line 37. Combustion gases may be vented to the atmosphere via vent 47 and the pressure of the retort is constantly monitored via line 48 which controls pressure regulator valve 15. Overpressure in the retort will close valve 15 halting combustion. Valve 16 is thermostatically controlled open until gases reach a minimum of 900° and then closes automatically.

The products of combustion in the retort 33 exit via line 43 and enter precooler 40 where the temperature of the gas mixture is reduced to the order of 150° F. to 200° F. The cooled gas is then conducted via line 44 to a water separator 45 where the principal water content of the combustion gases are removed. The product is then passed via line 46 to a compressor 50 and into a refrigeration-drier unit 51 where residual moisture is removed and the temperature of the gas generated reduced to storage temperature or 40° to 95° F. The gas then passes through a final carbon filter 52 and then to a storage vessel or to associated food processing apparatus. Gas is continuously sampled over line 48 and introduced into analyzer 49.

Connected to the water separator 45 is a pressure gauge G and a low pressure switch 53 which senses pressure in the retort 33 and controls the storage of gas by the compressor 50. Until gas pressure in the retort 33 and supply line 44 reaches the required intake pressure of the compressor 50 (e.g. to 6 in. of water) the valve 53 remains closed and thereafter opens. The combination of thermostatically controlled valve 16 and pressure sensitive valve 53 insure that the conditions within the retort are met for the proper gas mixture output.

Each of the valves, pumps and the refrigeration-dryer unit are supplied electrical power from the control panel 32. Manual controls initiate the flow of fuel gas through valve 11 and also begin ignition within the retort and start the pumps 23, 35 and 50. Thereafter system operation is automatic since the thermostatically controlled valve 16 and pressure sensitive valves 15 and 53 are operative to insure that only combustion gases of the regional temperature and pressure are transferred to any storage vessel or into use.

The foregoing system is designed for manual operation with a minimum of controls and yet with a high degree of uniformity of product. This uniformity is assured using the improved retort of FIG. 2.

Now referring to FIG. 2, the retort 33 may be seen as including a base ring closure 60 mounting a burner head assembly 61 in a vertical direction. The assembly 61 extends through the ring closure 60 and directs a flame through a refractory material cone burner block 62. The block 62 is surrounded by refractory base ring 63 which supports a tubular wall member 64 defining a combustion chamber 65 also of refractory material. Typically for a 500 c.f.h. system the tubular wall member has an inside diameter of approximately 15 inches and a wall thickness of 3 inches. The combustion chamber 65 is closed by an upper plate 66 also of refractory material and including a conical nozzle opening 70 which communicates with an expansion and cooling chamber 71. The combustion chamber and its wall member 64 are surrounded by a double walled enclosure including the inner wall 72 and end bell 73 and an outer wall 74 and its end bell 75. The lower ends of walls 72 and 74 are welded to a flange 76 to seal the chamber 80 therebetween. Flange 76 is secured by bolts or other demountable fasteners to upper flange 81 of the base ring assembly 60.

The annular space 82 between the combustion chamber side wall 64 and inner wall 72 defines the return path for combustion gases similar to the design of the above referenced Cameron patent. The wall 72 is surrounded by a cooling jacket due to the fact that the space between the inner wall 72 and outer wall 74 is filled with circulating cooling water. Circulation and heat transfer are enhanced by the presence of a helical ring 83 welded to the inner wall 72. The ring 83 requires the cooling water entering the chamber 80 to follow a helical path between the inlet 41 and outlet 42.

Combustion gases traveling downward through the annular space 82 are cooled and exit via line 84 for further cooling, drying and filtering as described in connection with FIG. 1 above.

The combustion chamber in accordance with this invention is distinct and differs from prior art devices in that it is vertically oriented and that it is virtually closed except for the exit nozzle 70 communicating with the cooled expansion chamber 71. Temperatures within the chamber as measured by thermocouples and range from 900° F. to 1900° F. with the end product, combustion gas virtually free of oxygen, acetylene and any unreacted hydrocarbons as required to meet standards for feed preserving atmospheres. It is believed that the vertical orientation assists in maintaining a uniform flame distribution along the sidewalls of the combustion chamber 65 and the top closure 66 tends to confine combustion as compared with an open end. As combustion gases exit through nozzle 70 they enter the expansion chamber 71 and come into contact with the chilled end wall 73 of the inner wall of the retort. The curved end wall 73 also serves to divert the combustion gases outward and downward into the annular passage 82.

Employing the retort of FIG. 2, the operation of the system assumes a high degree of reliability and a fully automated system may then be achieved. This is accomplished in the embodiment of FIG. 3 which includes each of the basic elements of the system of FIG. 1 and each identical element is identified by the same reference numeral as in FIG. 1. In addition to the basic elements, the system includes a solenoid operated main gas valve 100 under the control of the central control panel 101 and a thermostatically controlled vent valve 102 connected with the expansion chamber of the retort 33 to allow the controlled exhaust of combustion gases when not of storable quality. A flow responsive switch 103 connected to the main water line following pump 35 and is operative to shut down the system in the absence of predetermined flow through the cooling system. A differential pressure switch 104 is positioned in the combustion gas outlet line to avoid positive back pressures from reaching the retort 33. The CO analyzer 49 also is connected to the central control panel 101 to energize the vent valve 102 when the gas produced is either high or low in CO content.

Figure 3:
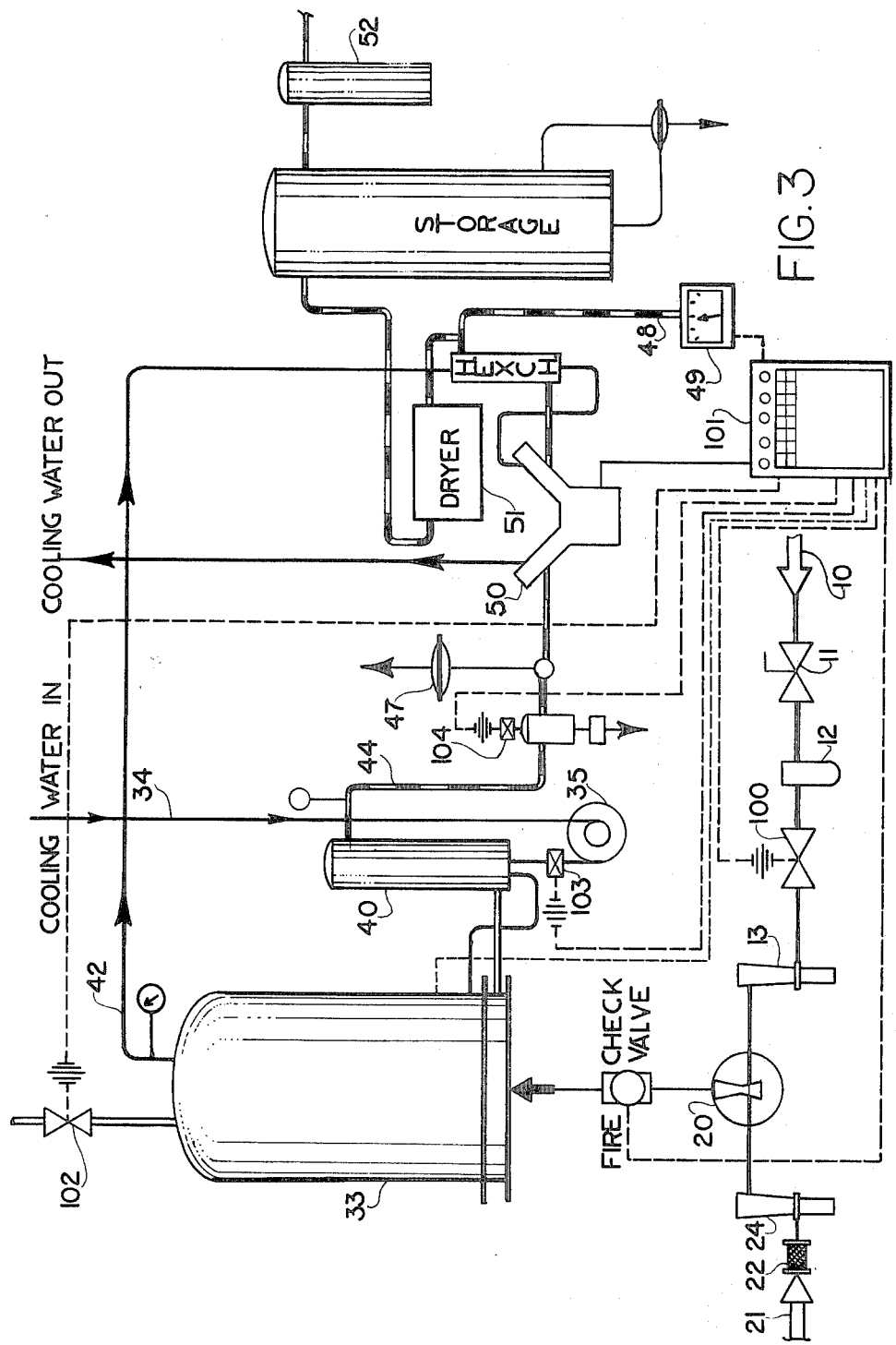
FIG. 3 is an alternate embodiment of this invention.

The automatic operation of the system of FIG. 3 is best described in connection with the electrical control system of FIGS. 4 and 5. The system is operated from an electrical line supply L1–L3 which powers a time clock 110 through a voltage dropping transformer 111. A main line switch 112 supplies operating current for the control assembly 101 through lines 113 and 114, transformer 115 and main internal buses 116 and 120. The three motors of the system found in water pump 35, gas air mixer 20 and compressor 50 of FIG. 3 are all supplied from line L1–L3 and switch 112 via contacts M1 and M2 of relay M of FIG. 5. Relay 1M is controlled by time clock 110 and energized through its contacts TC whenever the main control switch 121 is set in AUTO position. In this position, the operation of the system is under the control of relays TR6 and CR2 which are operated through contacts 1M1 whenever buses 116 and 120 are energized and motor relay 1M is operated. The water and gas mixing pumps are energized by the relay 1M and fuel and cooling water are then available for the system.

The system is first purged of any residual gas with the vent valve 102 open and amber lamp 122 is illuminated via relay contacts 2CR1. The gas valve 123 is opened by relay contacts 2CR2 and gas air mixture is introduced into the combustion chamber. An ignition transformer 124 supplies a spark to igniter 125 within the chamber and the gas is ignited. After ignition takes place and the retort reaches a temperature of approximately 1000° F. the vent valve 102 is automatically closed by a thermostatically controlled switch unshown in the drawing and green lamp 126 is energized via vent switch 127. After approximately one hour of operation combustion and the retort reaches a temperature of 1450° F. at which time acceptable gas is being produced.

The analyzer 49 of FIG. 3 continually monitors the CO content and as long as its level remains in the 3% range, relays 4CR and 5CR the low and high CO contact relays, remain unoperated and relay 3CR is operated. The detection of CO outside of that range causes the operation of the correct relay and a Red signal light 130 or 131 respectively to be illuminated via relay contacts 4CR1 or 5CR1. With the CO content in the normal range, green lamps 126 and 132 are energized indicating acceptable gas is being produced and stored.

At all times a photoelectric monitor or fire eye 140 located in the combustion chamber monitors the flame. If flame out or falure of ignition occurs, relay 2CR is de-energized and through contacts 2CR2, the gas valve 123 is opened preventing any buildup of explosive gases. An alarm 141 is energized and lamps 126 and 132 are extinguished. Any blowback of pressure in the combustion chamber activates switch 142 disabling gas flow in the same manner as photoelectric switch 140.

Water flow switch 103 senses flow rates of at least 5 g.p.m. and below that level shuts off the entire system to prevent the retort from overheating. Pressure sensitive switch 105 measures the pressure of gaseous product being producted by the combustion chamber at 4 to 6 inches of water which is adequate for the compressor 50 of FIG. 3 to pump into the storage vessel.

When the time clock operating period cycle terminates, contacts TC1 open and contacts TC2 close. The opening of contacts TC1 results in the operation of relays TR6 and CR6 and deenergization of relay TR1, CR1 and CR2. This results in the shutting down of the compressor 50, opening of contacts CR2 and opening of the 3M relay and contacts 3M1. The vent is opened by vent motor 128. After an hour or two of purging gases from the system and cooling of the retort timer relays TR1 and TR6 are deenergized and the entire system is shut down.

The system may be operated manually without the automatic cycling as described above. This is accomplished employing the manual setting of switch 121 and the manual switch 150 and reset button.

Above I have described two systems for the exothermic production of gases for food preservation. They both employ an improved retort and both incorporate a high degree of automatic contacts resulting in food preservation gases which have the precise composition required and are reliable enough for virtual unattended operation.

Certain of the components of the system are of standard commercial manufacture and those are identified below:

| | |
|---|---|
| Compressors 50 | U.S. Equipment Co. |
| Carbon filter 52 | Pall Western Corp. |
| Air pump 23 | Brenner-Fielder |
| Flame detector | Industrial Heating Co. JUM-2 Fire Eye |
| CO analyzer | Olson-Horiba |

The above-described embodiments of this invention are merely descriptive of its principles and are not to be considered limiting. The scope of this invention instead shall be determined from the scope of the following claims, including their equivalents.

What is claimed is:

1. Apparatus for the exothermic production of a gas mixture containing principally nitrogen with a controlled minor percentage of carbon monoxide and being substantially free of oxygen and hydrocarbons comprising:

a retort including an outer shell and an inner shell in spaced proximity;

said inner and outer shells defining a domed end portion;

means for maintaining a flow of cooling water through the space between said shells, the outer wall of said inner shell including a helical obstruction extending along said outer wall thereby channelling cooling water passing through said space between the outer wall of said inner shell and the inner wall of said outer shell;

a combustion chamber within the said inner shell constituting a substantially closed refractory chamber having side walls in close proximity to but spaced from the inner wall of said inner shell;

said combustion chamber including an inlet for a fuel-air mixture and a restricted outlet communicating with an enlarged domed space defined by an end of said combustion chamber and the adjacent end of said inner shell;

said retort oriented in a vertical direction with combustion gas flow upward within said combustion chamber through said domed space and downward outside of said combustion chamber adjacent to said inner shell;

said retort including an outlet for combustion gases communicating with said inner shell; and means for introducing a mixture of air and natural gas in a volume ratio of approximately 9 to 1 into said combustion chamber.

2. Gas generating apparatus for the production of a gas mixture containing principally nitrogen with a controlled minor percentage of carbon monoxide and being substantially free of oxygen and hydrocarbons comprising:

a retort including an outer shell and an inner shell in spaced proximity, the space between said shells constituting a cooling chamber;

a cooling system including pump means for supplying a continuous flow of cooling water to said cooling chamber of said retort;

flow responsive means in said cooling system for disabling the flow of fuel to said retort responsive to flow in said cooling system below a predetermined level;

a combustion chamber contained within said inner shell of said retort;

said retort including a first outlet for the collection of combustion gases and a second outlet for the discharge of combustion gases from said apparatus;

a temperature responsive valve means connected to the combustion chamber for discharging gases therefrom only through said second outlet when said combustion chamber is operating below a predetermined temperature;

means for introducing an air-fuel mixture into the said combustion chamber of said retort;

a valve means in said air-fuel supply means responsive to retort pressures above a predetermined level for terminating the introduction of fuel into said retort; and compressor means connected to said first outlet of said retort for compressing combustion gases delivered by said retort.

3. The combination in accordance with claim 2 including means for continuously monitoring the level of carbon monoxide in the combustion gases from said retort.

4. The combination in accordance with claim 2 including a pressure sensitive valve means connected in a path between said retort and said compressor for blocking said path in the presence of discharge gases from said retort at less than a predetermined pressure level.

5. The combination in accordance with claim 4 including relay means controlled by said pressure sensitive valve means for stopping said compressor means responsive to discharge gases from said retort at less than a predetermined pressure level.

6. The combination in accordance with claim 2 including central control means providing operating power to said pump means, compressor means, and valve means.

7. The combination in accordance with claim 6 wherein said central control means including relay means for terminating the introduction of fuel into said retort responsive to either over pressure in the retort or insufficient flow in said cooling system.

8. Gas generating apparatus for the production of a gas mixture containing principally nitrogen with a controlled minor percentage of carbon monoxide and being substantially free of oxygen and hydrocarbons comprising:

a retort including an outer shell and an inner shell in spaced proximity, the space between said shells constituting a cooling chamber;

a cooling system including pump means for supplying a continuous flow of cooling water to said cooling chamber of said retort;

flow responsive means in said cooling system for disabling the flow of fuel to said retort responsive to flow in said cooling system below a predetermined level;

a combustion chamber contained within said inner shell of said retort;

said retort including a first outlet for the combustion gases and a second outlet for the discharge of combustion gases from said apparatus;

a temperature responsive valve means connected to the combustion chamber for discharging gases therefrom only through said second outlet when said combustion chamber is operating below a predetermined temperature;

air-fuel supply means for introducing an air-fuel mixture into said retort;

motor means for controlled operation of said temperature responsive valve means;

a valve means in said air-fuel supply means responsive to retort pressures above a predetermined level for terminating the introduction of fuel into said retort;

compressor means connected to said first outlet of said retort for compressing combustion gases delivered by said retort; and timer means for periodically terminating the operation of the system by interrupting power to said compressor and activating said motor means to open said temperature responsive valve means.

9. The combination in accordance with claim 8 including means in said air-fuel supply means responsive to said timer means for controlling the duration of introduction of fuel into said system.

10. The combination in accordance with claim 8 including second timer means for maintaining the flow of cooling water through said retort after the termination of introduction of fuel into said retort.

11. The combination in accordance with claim 8 wherein said retort includes a refractory combustion chamber including a restricted outlet between the combustion chamber and the interior of said inner shell and including a re-entrant flow path of combustion gases outside of said combustion chamber.

12. The combination in accordance with claim 8 including means for monitoring the carbon monoxide content of combustion gases from said system and control means responsive to the detection of carbon monoxide outside of a predetermined range for opening said temperature responsive valve means connected to said combustion chamber for discharging the combustion gases only through said second outlet during a period of operation having carbon monoxide content outside of said predetermined range.

13. The combination in accordance with claim 8 including means in said retort for monitoring the flame of combustion within said combustion chamber and including valve means responsive to a failure of combustion flame within said combustion chamber for terminating the introduction of fuel into said retort.

14. The combination in accordance with claim 13 including alarm means operative in response to the detection of flame failure by said monitoring means.

References Cited

UNITED STATES PATENTS

| | | | |
|---|---|---|---|
| 1,952,005 | 3/1934 | Willenborg | 23—281 |
| 2,714,552 | 8/1955 | Martin | 23—281 |
| 2,756,215 | 7/1956 | Burgess et al. | 23—281 X |
| 2,779,667 | 1/1957 | Keith | 23—281 X |
| 3,177,150 | 4/1965 | Cameron | 23—281 X |
| 3,215,503 | 11/1965 | Nessler | 23—281 |
| 3,421,859 | 1/1969 | Kruggel | 23—281 |

FOREIGN PATENTS

| | | | |
|---|---|---|---|
| 869,925 | 5/1971 | Canada | 23—262 |

BARRY S. RICHMAN, Primary Examiner

U.S. Cl. X.R.

23—262, 277 R